May 19, 1964     C. FULOP     3,133,601

IMPACT DRILL

Filed March 20, 1962     2 Sheets-Sheet 1

INVENTOR.
CHARLES FULOP
BY
Sanford Schnurmacher
ATTORNEY.

May 19, 1964  C. FULOP  3,133,601
IMPACT DRILL
Filed March 20, 1962  2 Sheets-Sheet 2
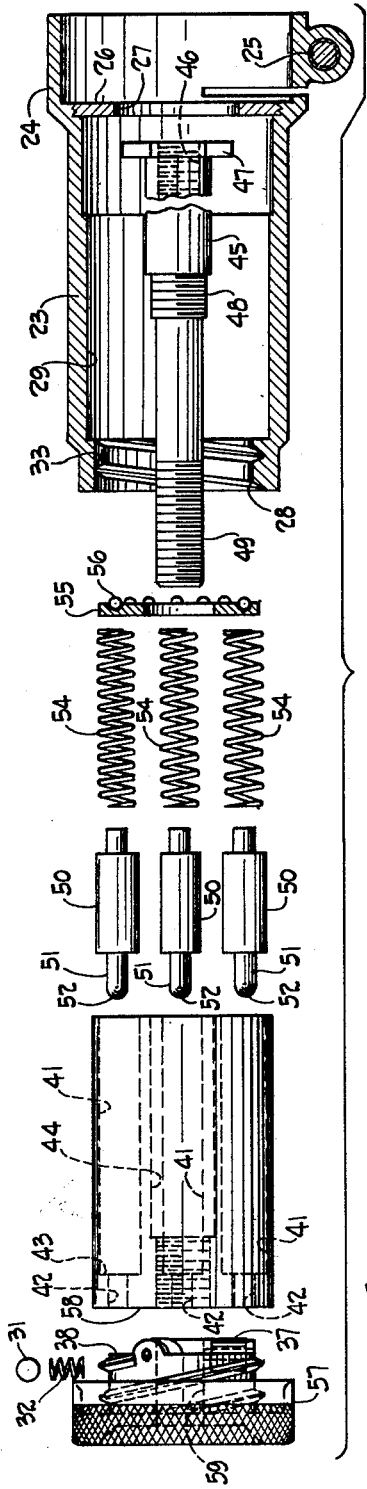
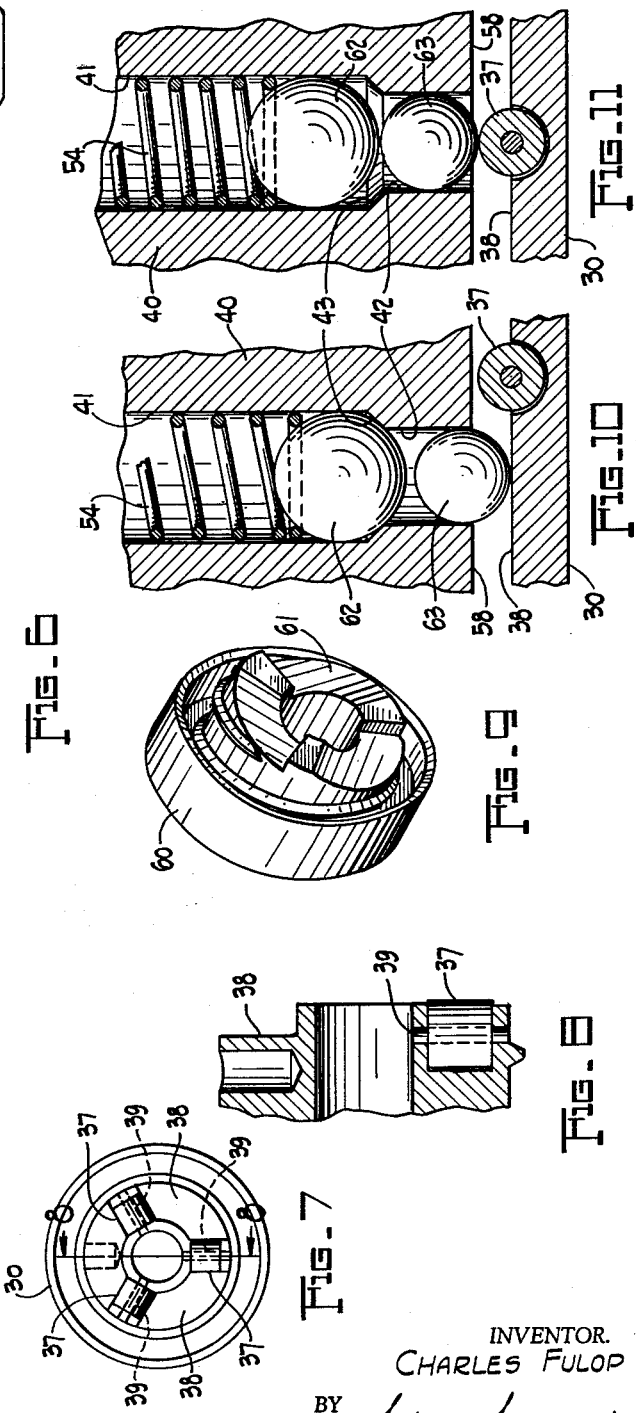
INVENTOR.
CHARLES FULOP
BY
ATTORNEY United States Patent Office 3,133,601
Patented May 19, 1964

3,133,601
IMPACT DRILL
Charles Fulop, 131 Skyview Drive,
Seven Hills Village, Ohio
Filed Mar. 20, 1962, Ser. No. 181,023
4 Claims. (Cl. 173—97)

This invention relates to impact drills and particularly to such a tool whose impact can be adjusted between wide limits.

While not limited thereto, the present invention finds particularly utility in the drilling of brick, concrete, rock, or similar materials with high speed diamond or cemented-carbide drill points. Such drill points create a glazing action ahead of the drill in the material being bored.

The primary object of the invention is to provide an impact drill that will break up such glazed areas by a multiplicity of relatively low mass impacts rather than a few high mass impacts which would shatter brittle diamond and cemented-carbide points.

Another object is to provide an impact drill having no parts which reciprocate on the axis of the driving spindle, thereby doing away with all frictional contact between rotating and non-rotating surfaces which would cause excessive heating after prolonged operation.

A further object is to provide an impact drill having both hammer and anvil carried by the drill spindle so there is no loss of energy due to the interaction of the impacting elements.

Still another object is to provide a device of the type stated that may be manufactured readily and economically with a minimum of machining of the various components thereof, which is rugged in construction, reliable in operation and fully adjustable as to the force of the delivered impact.

These and other objects of the invention will become apparent from a reading of the following specifications and claims, together with the accompanying drawings, wherein like parts are preferred to and indicated by like reference numerals, and wherein:

Figure 2:
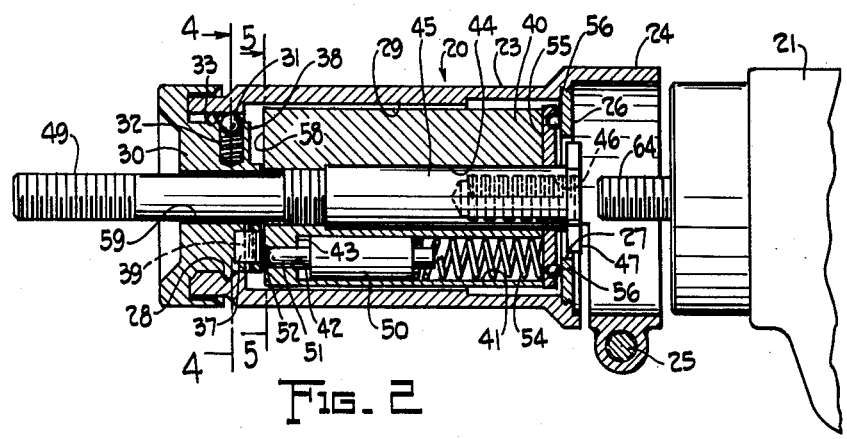
FIGURE 2 is a longitudinal, sectional view of the housing assembly, in the preferred embodiment thereof, showing one of the hammers in its position of maximum retraction immediately prior to the delivery of its maximum impact stroke.
Figures 3, 4, 5:
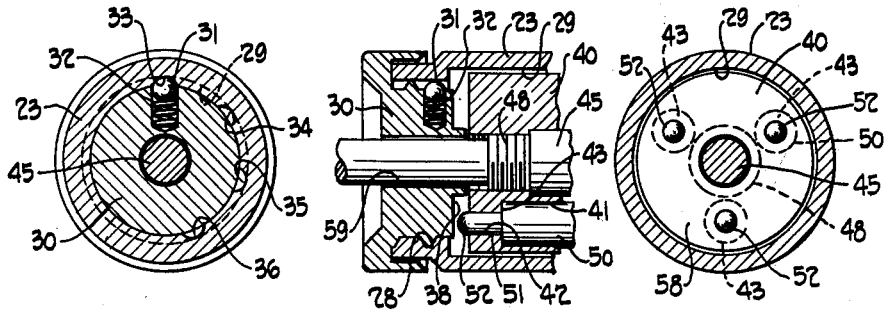
FIGURE 3 is a partial sectional view of the same, showing one of the impact hammers at the end of its maximum stroke at the moment of impact.

FIGURES 4 and 5 are sectional views, respectively, taken along the arrowed lines 4—4 and 5—5 of FIGURE 2;

FIGURE 6 is an exploded view of the device;

FIGURE 7 is a right end view of the cam cap illustrated in FIGURE 6;

FIGURE 8 is a sectional view of a portion of the cam cap taken along the line and in the direction of the arrows 8—8 of FIGURE 7;

FIGURE 9 is a perspective view of an alternate type of cam cap having a series of interconnected, inclined plane teeth;

FIGURE 10 is an enlarged, fragmentary, sectional view showing the hammer having the form of a ball and illustrating same at its moment of impact; and FIGURE 11 is a view similar to that of FIGURE 10, with the ball hammer in its position of maximum retraction, immediately prior to the delivery of its maximum impact stroke.

Figure 1:
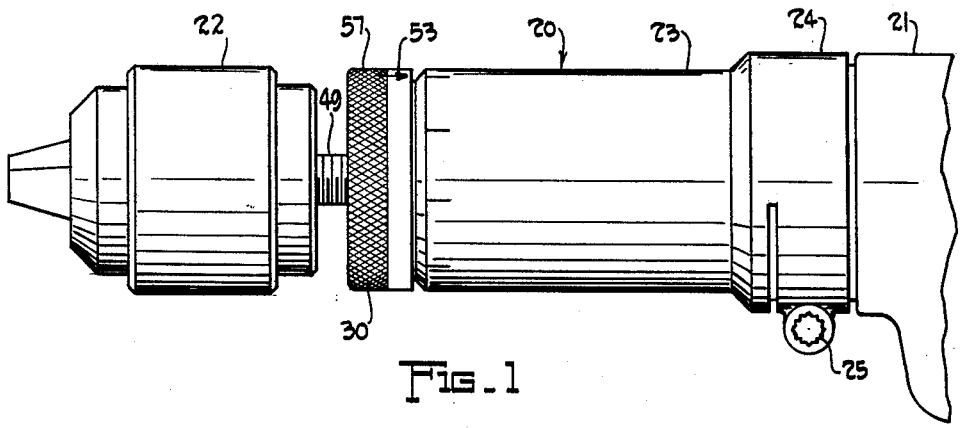
FIGURE 1 is a side elevation of the variable impact vibrating drill that is the subject of this invention.

Referring more particularly to the drawings, there is seen in FIGURE 1 the variable impact vibrating drill that is the subject of this invention, broadly indicated by reference numeral 20.

Reference numeral 21 indicates the case of a portable electric motor of the type capable of being held in the hand in the manner of a conventional electric drill.

A spindle housing, or shell, 23 is clamped on the motor case 21 through a collar 24 which is locked thereon by means of a clamp bolt 25.

A spindle 45 extends through the housing, as seen most clearly in FIGURE 2, and forms a continuation of the drill motor shaft 64 which engages the threaded bore 46 of the spindle. The free end of the spindle passes through the bore 59 of the cam cap 30, which closes the end of the housing 23, and is threaded, as at 49, to receive a drill bit holding chuck 22. The housing also has an annular partition wall 26 with a center hole 27 therethrough which clears the headed end 47 of the spindle 45. Thus the spindle 45 passes through, but is not supported by the housing shell 23.

Reference numeral 40 indicates a solid cylindrical anvil which has an axial bore 44 through which the spindle 45 passes and is secured immovably thereto through a threaded section 48. The anvil 40 and spindle 45 thus become a single unit, and in fact could be shaped from a single piece of shafting, if desired.

The anvil 40 has three, two-diameter bores therethrough spaced equal distances apart and positioned radially outward from the axis of spindle 45 and parallel thereto and to each other. While 3 bores are shown in the preferred embodiment of the invention, it is to be understood that any desired number may be used. Each bore has a large diameter 41, a small diameter 42, and an annular shoulder or seat 43 at the junction point of the two diameters, as is seen most clearly in FIGURE 6.

Reference numeral 50 indicates a cylindrical hammer which is slidably mounted in the large diameter bore 41 with a cylindrical cam follower pin 51, formed integral therewith and of a diameter to slidably interfit the small diameter bore 42. The free end 52 of the pin 51 is ball shaped, as is seen most clearly in FIGURE 6. It is of course to be understood that there is a hammer 50 for each bore 41.

The hammers 50 are normally pressed against anvil seats 43 by a coil spring 54 which is positioned behind the hammer 50 in each bore 41. A pressure washer 55 is mounted on the spindle 45 immediately ahead of the head 47 in compressed engagement with the ends of the springs 54. A ring of spaced ball bearings 56 is embedded in the side of the washer facing the housing partition 26, which acts as friction free thrust bearings.

The cam cap 30 is threadedly engaged with the housing 23 through an internal thread 28 at the end of the housing. The cap has a smooth, circular flange 57 which has a position indicating arrow 53 engraved thereon, as seen in FIGURE 1. Three radially extending and circumferentially spaced cam rollers are mounted on the inner face of the cap in apposition to the end wall 58 of the anvil cylinder 40. The spacing of the rollers is the same as that of the cam pin bores 42. Each roller 37 is journaled on a shaft 39 and is free to rotate thereon. The surface of the rollers is raised above the face or floor 38 of the cap 30, as is seen most clearly in FIGURES 6 and 8.

It will be evident that by rotating the cam cap 30, the cam rollers 37 can be moved toward or away from the end face 58 of the anvil 40, for a purpose to be hereinafter disclosed. Four locator cavities 33, 34, 35 and 36 are positioned in the face of the internally threaded end of the housing 23. A spring pressed locator ball 31 is mounted in the cam cap and urged outward by the spring 32. This provides 4 pre-determined, locked positions for the cam rollers 37 with reference to the face 58 of the anvil cylinder 40 which can be obtained by merely rotating the cap 30 either clockwise or counter-clockwise.

The length of the cam follower pins 51 is made such that when the rollers 37 are in their maximum advanced position, nearest the anvil face 58, the ends 52 of the pins 51 will clear the cam floor 38 when the hammers 50 are seated on the anvil seats 43, as is seen most clearly in FIGURE 3. Thus the hammer pins 51 will never strike or touch the floor 38 of the cam cap 36 but will only ride up and over the rollers 37.

A study of FIGURE 2 will make it evident that the spindle 45, the anvil cylinder 40 and the hammers 50 positioned therein, all revolve as a single unit with no heat creating, reciprocating or rotating surfaces therebetween.

As the spindle 45, carrying the tool holding chuck 22, revolves, the ends 52 of the cam follower pins 51, which extend beyond the end face 58 of the anvil, are moved across the faces of the rollers 37 mounted on the stationary cam cap 30. As each pin 51 rides across a roller 37, it is pushed into its bore 42 and raises its hammer 50 off the anvil seat 43, against the biasing action of the spring 54 which becomes compressed, as is seen most clearly in FIGURE 2.

When the rotation of the anvil carries the pin 51 beyond its engaged roller, as seen in FIGURE 3, the spring 54 expands and snaps the hammer 50 sharply against the anvil seat 43 which imparts an impact to the spindle 45 and the tool held in chuck 22 which are in effect all of a single piece. There is no lost energy such as occurs in prior art devices wherein a moving hammer has to transmit its energy to a stationary anvil, or vice versa.

By varying the number of hammers and the speed of the spindle, the number of impacts obtainable per minute can become upwards of tens of thousands, which makes for fast and efficient drilling in masonry and rock.

It will also be evident that there is no sliding contact between the hammer 50 and the anvil seat 43 to create friction and resultant heat, which again represents lost energy.

FIGURE 9 illustrates an alternate type of cam cap 60 having a series, in this case 3, inclined cam surfaces joined through abruptly descending surfaces, which in effect produce the same action as the rollers 37 of the preferred type.

FIGURES 10 and 11 show another alternate type wherein the hammer elements are in the form of steel balls 62, which are lifted by cam followers in the form of steel balls 63.

In this type it will be noted that the size and length of the bore 42 and the diameter of the ball 63 is such that when the hammer ball 62 strikes the anvil seat 43, the cam follower ball 63 will ride on the cam surface 38 and out of contact with the hammer 62. Thus there is no direct impact between the hammer ball 62 and the cam cap 30. All impact is against the anvil seat 43, with the cam follower ball 63 riding free during the impact period, as is seen most clearly in FIGURE 10.

As seen in FIGURE 11, the cam roller 37 acts to raise the cam follower ball 63 into the bore 42. The rising ball 63 lifts the hammer ball 62 off the anvil seat 43 to compress the spring 54 which reacts to drive the hammer 62 against the anvil seat 43 when the cam follower ball 63 is no longer supported by the cam roller 37, as seen in FIGURE 10.

In all the embodiments of the device, variation of impact force can be had by varying the distance between the cam surfaces and the end face 58 of the anvil cylinder 40. This is conveniently achieved by rotating the cam cap 30 or 60, as explained hereinbefore. As the distance between the cam surfaces and the end face 58 becomes greater, the lifting action of the cam becomes less because the cam followers 51 or 63 are not moved as far by the cam surfaces.

It will now be clear that there has been provided a device which accomplishes the objectives heretofore set forth.

While the invention has been disclosed in preferred and alternate forms, it is to be understood that the specific embodiments thereof as described and illustrated herein are not to be considered in a limited sense, as there may be other forms or modifications of the invention which should also be construed to come within the scope of the appended claims.

I claim:

1. An impact drill, comprising in combination, an electric motor, including a drive shaft, mounted in a case having a hand grip; a spindle housing mounted on the case at the drive shaft; a spindle mounted on the end of the drive shaft, forming a continuation thereof, and extending through the housing; tool holding means mounted on the free end of the spindle, beyond the housing; a cylindrical anvil co-axially mounted on the spindle, within the housing, and rotatable therewith; the anvil having a plurality of bores therethrough, spaced from and parallel to the axis of the spindle, each of said bores being counter-bored to define an anvil seat at the inner end of each counter-bore; a cylindrical hammer slidably mounted in each of said counter-bores, freely movable longitudinally of said counter-bores toward and away from their respective anvil seats; a pressure washer mounted on the spindle, against the anvil, and covering the outer ends of the counter-bores; spring means mounted in each counter-bore, between the washer and hammer, for normally biasing each hammer to a first position, wherein it bears against the anvil seat thereof; a cam-follower mounted in each of the anvil bores, of a length such that it will contact the hammer and protrude beyond the end of the anvil, when the hammer is in its first position; and a stationary cam mounted on the housing, in co-axial relation with said rotating spindle, opposed to and spaced from the circular travel path of the anvil bores, having an interrupted cam surface engageable with the cam-followers protruding from the rotating anvil, when the hammers are in their first positions, to push the hammers longitudinally of the anvil counter-bores, against the biasing action of the springs, to a second position, spaced from the anvil seats; the hammers being returned to their first positions, by the spring, when engagement between the cam and cam-followers is interrupted as the cam-followers are moved relative to the cam surfaces by the rotation of the anvil.

2. An impact drill, comprising in combination, an electric motor, including a drive shaft, mounted in a case having a hand grip; a spindle housing mounted on the case at the drive shaft; a spindle mounted on the end of the drive shaft, forming a continuation thereof, and extending through the housing; tool holding means mounted on the free end of the spindle, beyond the housing; a cylindrical anvil co-axially mounted on the spindle, within the housing, and rotatable therewith; the anvil having a plurality of bores therethrough, spaced from and parallel to the axis of the spindle, each of said bores being counter-bored to define an anvil seat at the inner end of each counter-bore; a cylindrical hammer slidably mounted in each of said counter-bores, freely movable longitudinally of said counter-bores toward and away from their respective anvil seats; a pressure washer mounted on the spindle, against the anvil, and covering the outer ends of the counter-bores; spring means mounted in each counter-bore, between the washer and hammer, for normally biasing each hammer to a first position, wherein it bears against the anvil seat thereof; a cam-follower mounted in each of the anvil bores, of a length such that it will contact the hammer and protrude beyond the end of the anvil when the hammer is in its first position; a stationary cam mounted on the housing, in co-axial relation with the rotating spindle, opposed to and spaced from the circular travel path of the anvil bores, having an interrupted cam surface engageable with the cam-followers protruding from the rotating anvil, when the hammers are in their positions, to push the hammers longitudinally of the anvil counter-bores, against the biasing action of the springs, to a second position, spaced from the anvil seats; the hammers being returned to their first positions; by the springs, when engagement between the cam and cam-followers is interrupted as the cam-followers are moved relative to the cam surfaces by the rotation of the anvil; and impact control means mounted on the housing for changing the operative distance between the cam surfaces and the cam-followers, whereby longitudinal travel of the hammers in the anvil counter-bores relative to the anvil seats, may be varied.

3. An impact drill as defined in claim 1, wherein the cam-followers and hammers have the form of steel balls of a diameter to loosely interfit the anvil bores and counter-bores, respectively.

4. An impact drill, comprising in combination, an electric motor, including a drive shaft, mounted in a case having a hand grip; a spindle housing mounted on the case at the drive shaft; a spindle mounted on the end of the drive shaft, forming a continuation thereof, and extending through the housing; tool holding means mounted on the free end of the spindle, beyond the housing; a cylindrical anvil co-axially mounted on the spindle, within the housing, and rotatable therewith; the anvil having a plurality of two-diameter bores therethrough, spaced from and parallel to the axis of rotation of the spindle, and defining an anvil seat and the junction of the two diameters; a two-diameter cylindrical hammer slidably fitted in each of said bores; the junction between the two diameters defining a hammer head faced toward the anvil seat; that portion of the hammer in the smaller diameter of the bore defining a cam-follower that extends beyond the end face of the anvil when the hammer is in a first position, wherein its head is in contact with the anvil seat; a pressure washer mounted on the spindle, against anvil, and covering the rear openings of the anvil bores; spring means mounted in each bore between the washer and hammer, in pressed engagement with the hammer, for normally biasing the hammer to its first position; and a stationary cam mounted on the housing in co-axial relation with said rotating spindle, opposed to and spaced from the travel path of the seat end of the anvil bores, having an interrupted cam surface engageable with the cam-followers protruding from the rotating anvil, when the hammers are in their first positions, to push the hammers longitudinally of the anvil bores, against the biasing action of the springs, to a second position, wherein the hammer heads are spaced from the anvil seats; the hammers being returned to their first positions by the springs when engagement between the cam and cam-followers is interrupted as the cam-followers are moved relative to the stationary cam surfaces by the rotation of the anvil.

References Cited in the file of this patent
UNITED STATES PATENTS

| | | |
|---|---|---|
| 2,270,929 | Bugg | Jan. 27, 1942 |
| 2,968,960 | Fulop | Jan. 24, 1961 |
| 2,974,533 | Demo | Mar. 14, 1961 |
| 2,974,535 | Morris | Mar. 14, 1961 |
| 2,979,962 | Nindel | Apr. 18, 1961 |